United States Patent [19]

Jenkins, Jr.

[11] Patent Number: 4,652,180

[45] Date of Patent: Mar. 24, 1987

[54] IN SITU STABILIZATION OF WASTE LIQUID ENCATCHMENTS

[76] Inventor: George W. Jenkins, Jr., 107 Sunset St., Amarillo, Tex. 79106

[21] Appl. No.: 751,380

[22] Filed: Jul. 3, 1985

[51] Int. Cl.$^4$ .......................... E02D 3/12; G21F 9/20
[52] U.S. Cl. .................................... 405/269; 405/128; 405/266
[58] Field of Search .............. 405/128, 129, 258, 263, 405/266, 269, 270, 271, 241; 106/85; 210/751, 170, 208, 219, 738; 222/413, 526, 626

[56] References Cited

U.S. PATENT DOCUMENTS

| | | | |
|---|---|---|---|
| 3,397,542 | 8/1968 | Moulder | 405/266 |
| 3,540,837 | 11/1970 | Pascucci | 405/269 X |
| 3,675,428 | 7/1972 | Watts | 405/271 X |
| 4,043,909 | 8/1977 | Endo et al. | 405/270 X |
| 4,058,986 | 11/1977 | Granholm | 222/368 X |
| 4,338,134 | 7/1982 | Graf zu Münster | 405/128 |
| 4,448,690 | 5/1984 | Maphis | 405/128 X |

OTHER PUBLICATIONS

American Resources Corporation brochure "The Permix Process; Alternate Technologies".

Primary Examiner—Dennis L. Taylor
Assistant Examiner—Nancy J. Stodola
Attorney, Agent, or Firm—Fidelman, Wolffe & Waldron

[57] ABSTRACT

A solidification apparatus in the form of a rack and prongs rake structure, the prongs of which are a multiplicity of hollow tubes, each tube containing a serrated augar for providing augar assisted feeding of a gaseous suspension of cementing solids through the hollow tubes into the liquid, the rack supporting each hollow tube tine being pivotally attached to the arm of a backhoe so that the backhoe operator can generate lateral, pivotal and longitudinal movement of the tubes in the liquid while the gaseous suspension is being added to the liquid, a guard ring being provided at the open end of each tube for preventing submersion of the tube ends into the bed underlying the liquid of the encatchment.

6 Claims, 9 Drawing Figures

Fig. 9

IN SITU STABILIZATION OF WASTE LIQUID ENCATCHMENTS

This invention is directed to a machine and process for disposal of non-hazardous and hazardous wastes and sludges, and in particular, towards solidification of liquid form wastes collected in an encatchment.

BACKGROUND OF THE INVENTION

A great many manufacturing processes and mineral recovery procedures are characterized by generation of liquid form wastes, some of which are hazardous. Commonly, the liquid wastes are discharged to an encatchment, such as, for example, tailing ponds and sludge pits wherein the solid contents settle out and the clarified liquid is withdrawn, or the liquid is evaporated. Some liquid wastes are relatively permanent and must be solidified. Others should be solidified. Although industry has long been concerned with disposal of hazardous liquid wastes, more and more public attention is being directed to shortcomings believed to exist.

In particular, practices that long have been accepted by the public, such as discharge of highly acidic mine waters into the local streams are now being challenged. In addition, it is now appreciated that water soluble polutants go into solutions that can migrate many miles subterraneously through porous strata underlying a waste liquid encatchment. In consequence, many industries find themselves in a position where their liquid or slurry waste products must be connverted into some that retains the toxic components of the liquid in place. This very thought suggests conversion of liquid wastes into some solid form, wherein the water itself is in water insoluble form physically trapped in a solid mass of very low permeability. Liquids may be solidified permanently and readily through conduct of some chemical reaction appropriate to the composition of the particular liquid.

Thus, for example, an aqueous liquid of semi-liquid waste material can be solidified by mixing such material with appropriate amounts of a hydraulic cement, after which the mixture is allowed to set. For further understanding of such liquid solidification procedures, reference is made to U.S. Pat. Nos. 3,980,558; 4,226,630; and 4,338,134. Practice of the present invention employs the concept of solidifying liquid waste. In specific, this invention relates to an in situ solidification of the standing bodies of liquid in waste liquid catchments such as, for example, sludge pits, settling ponds.

The approach adopted by the inventor hereof toward solidifying a standing body of liquid bears a distinct resemblance to concepts and equipment heretofore employed by the art to convert unstable soils into more stable form by introduction of a pulverulent ground stabilizing agent. In brief, a hollow tool, often formed as a drill head, is extended below the ground surface to a desired locale, then binding agent is introduced into the unstable strata from nozzle apertures in the tool so that the binding agent becomes mixed with the earth material. For further understanding of this technique, reference is made to U.S. Pat. Nos. 3,540,837 and 4,058,986.

It is now been found possible to stabilize waste liquid catchments waste effectively and efficiently by such a technique.

RATIONALE OF THE INVENTION

Recognition by the art that liquid wastes may be solidified has not extended heretofore to provision of practical relatively inexpensive methods for accomplishing in situ solidification of a waste liquid catchment, nor to practical equipment for accomplishing this desired result.

The equipment must be capable of withstanding a rather harsh environment, notably dust from the cementing material, semi-solid sludge accumulations on catchment bottoms, and splashes of the liquid wastes. Provision must be made for introducing a solidification tool into liquid, then withdrawing same from solidified material. Leaving behind pockets of unsolidified liquid and introducing an excess of cementing material should be avoided. Thorough mixing of cementing material into the liquid waste is most important.

The overall approach adopted in the practice of this invention is admixing of a gaseous suspension of a cementing (solid) material with the liquid in the catchment. The carrier gas churns up the liquid which helps to disseminate the cementing solids into the liquid. Within a short period of time, the mixture of cementing material and waste liquid coalesces into solid form. The tool for delivering the gaseous suspension is a sturdy hollow tube mounted for lateral, longitudinal and pivotal movement against the ever-increasing resistance of a solidifying mass. In addition, the delivery tube structure provides assurance against plugging in the event of failure in the suspension delivery means. The port end of the delivery tube is not permitted to become embedded in the bed of the waste liquid catchment.

In total, the object of the present invention is to provide a reliable device for introducing a gaseous suspension of cementing material uniformly into all regions of a waste liquid catchment, so that uniform and complete solidification may be achieved.

BRIEF DESCRIPTION OF THE INVENTION

The process and apparatus of the present invention can be visualized in a conceptual sense as a much oversized garden rake whose (hollow) prongs or teeth are submerged in the waste liquid of the catchment. The rake is moved back and forth and/or side to side continuously or intermittently and all the while is operated to introduce a gaseous suspension of cementing material into the waste liquid from the bottom of the prongs. Often, the soft mud or settled sludge underlying the liquid is stirred up during the rake movement to become part of the solidified mass.

The framework corresponding to the transverse bar of a garden rake (from which the prongs depend) is pivotally secured to the "handle" so that the prong also may be moved pivotally. The arm a backhoe or the like is contemplated for the "handle" component.

The prongs are relatively large hollow tubes. Preferably, introduction of the gaseous suspension is assisted by a mechanical feed mechanism inside the tubes driven by motors mounted in the aforementioned framework. A guard means is located at the end of each tube to keep the tubes, themselves, from being pushed into the bed of the catchment. The power assist needs depend upon the depth of the sludge and the viscosity (thickness) of the sludge.

After a while, enough cementing material has been introduced to solidify all the waste liquid in the catchment region being transversed by the tubes, whereupon the apparatus is moved to an adjoining region of the catchment.

Thus, the apparatus of this invention is adapted to be mounted on the arm of a backhoe or the like in substitution for the usual shovel component on the backhoe, and accordingly, operation of the backhoe arm through the usual mechanisms on a backhoe (by a skilled backhoe operator) will generate the lateral, longitudinal and/or pivotal movements desired during operation of the apparatus of this invention.

To solidify a waste liquid catchment, the backhoe may be driven as near to the bank of the catchment as is reasonable and/or safe, then the apparatus of this invention is extended out over the waste liquid. As an aside, it is noted that on occasion, the backhoe, and sometimes other earth moving equipment, may be needed to build up the catchment bank into a safe support for the apparatus of this invention.

If the marginal edges of the catchment are shallow, and with a soft bed, the operator may want to pivot the apparatus so that the tubes are at an angle to the surface, yet touch the bottom. Moving the apparatus side to side causes the guards to stir mud off the bottom and, in effect, allows introduction of cementing material into the catchment bed. Solidification converts bottom mud and waste liquid alike into a solid material firm enough to support the backhoe.

If the waste liquid catchment is deeper than the tubes, the operator cannot initially feel the bottom. The operator might then set the tubes vertical in the liquid, and work over a small square bankside area until the bed bottom has been raised to where the guard means are touching solid materials, and then either shift the tube set to a next adjacent deep area or raise the tubes and manipulate the apparatus so as to solidify clear to the surface of the catchment, creating, thereby, new bank region.

Desirably, a constant feed rate of cementing material is provided, not withstanding the substantial variation in resistance to flow of the suspension that occurs during the course of solidification. This helps ensure a steady and complete solidification that avoids liquid pockets. The operator of the backhoe can feel the solidification taking place at the discharge region of the apparatus, can sense when it is complete, and then move the discharge end of the tubes.

Suitably, the catchment is solidified by the procedure described above, area by area, either through advancement of the apparatus completely around the catchment periphery or across the catchment from one, two or three sides thereof. At about the initial starting point, the apparatus can move onto the newly formed bank area and go on to solidify a new area, thus spiralling toward the center or working across from one end to the other, until the entire catchment has been solidified. It may be noted that the finally solidified waste liquid of the catchment is frangible solid, not some monolithic concrete mass. The catchment area can then be covered with soil and planted with some ground cover.

Certain features in the apparatus of this invention are particularly noteworthy.

Integral attachment of the apparatus rake to the operating arm of a backhoe or the like (in place of the shovel normally thereon) is important to provide the mechanical rigidity and strength required to move the apparatus laterally and/or longitudinally and/or pivotally through the solidifying mass. More versatility than capacity merely to raise and lower a tube set has been found necessary for good solidification. In addition, rigid linkages to the arm of the backhoe or the like provides a skilled machine operator with the sense of feel for the bottom. The operator can sense when solidification has advanced to completion and accordingly when the apparatus should be shifted. The guards at the tube ends are important to this sense of feel, and, of course, they serve to prevent plugging of the tube port(s).

One redundancy feature has been found to be highly desirable. Specifically, presence of a power assist for dispensing the gaseous cementing material suspension. A conveying auger is provided inside each tube. However, the auger is short and is serrated so that when, as, and, if the auger does not rotate, the suspension can pass through the serrations to an exit port from the tube. This suspension feed system has been found to operate well.

DETAILED DESCRIPTION OF THE INVENTION

For further understanding of the invention, reference is made to the attached drawings wherein.

To revert to the rake analogy, the working arm 12 on backhoe 15 constitutes rake handle; the transverse framework 25 constitutes rake bar; and the tube set 35 constitute rake prongs. Framework 25 is secured to backhoe arm 12 just as a shovel member is ordinarily secured thereto, rigidly and also pivotally. A pair of upstanding plates 22 on framework 25 straddling the end of backhoe arm 12 form seat for the pin 24 on which the terminus of arm 12 is pivotally mounted and the pin 28 on which one end 27 of the rocker arms 26 are pivotally mounted. The other end 29 of rocker arm 26 are pivotally mounted on arm 12 by a pivot pin 31. A crossbar 28 joined to the rocker arms 26 at about the juncture of ends 27 and 29 forms the point of attachment for the hydraulic piston 30 mounted on arm 12 of backhoe 15. Thus, when hydraulic piston 30 is extended from, or retracted within, hydraulic cylinder 32, reciprocating motion, the crossbar 28 too reciprocates, causing rocker arms 26 to pivot or oscillate around the pin 31 (on arm 12), thereby pivoting framework 25 and all that is rigidly secured thereto. It may be noted that the large backhoe type, on which the apparatus of this invention would normally be mounted, is provided with an arm that is multi-jointed (e.g., two elbows), and, therefore, pivotal movement at the arm joints under the machine operator's control can change the attitude of framework 25 independently of the already described pivoting movement achieved by operating of hydraulic piston 30.

Figure 1:
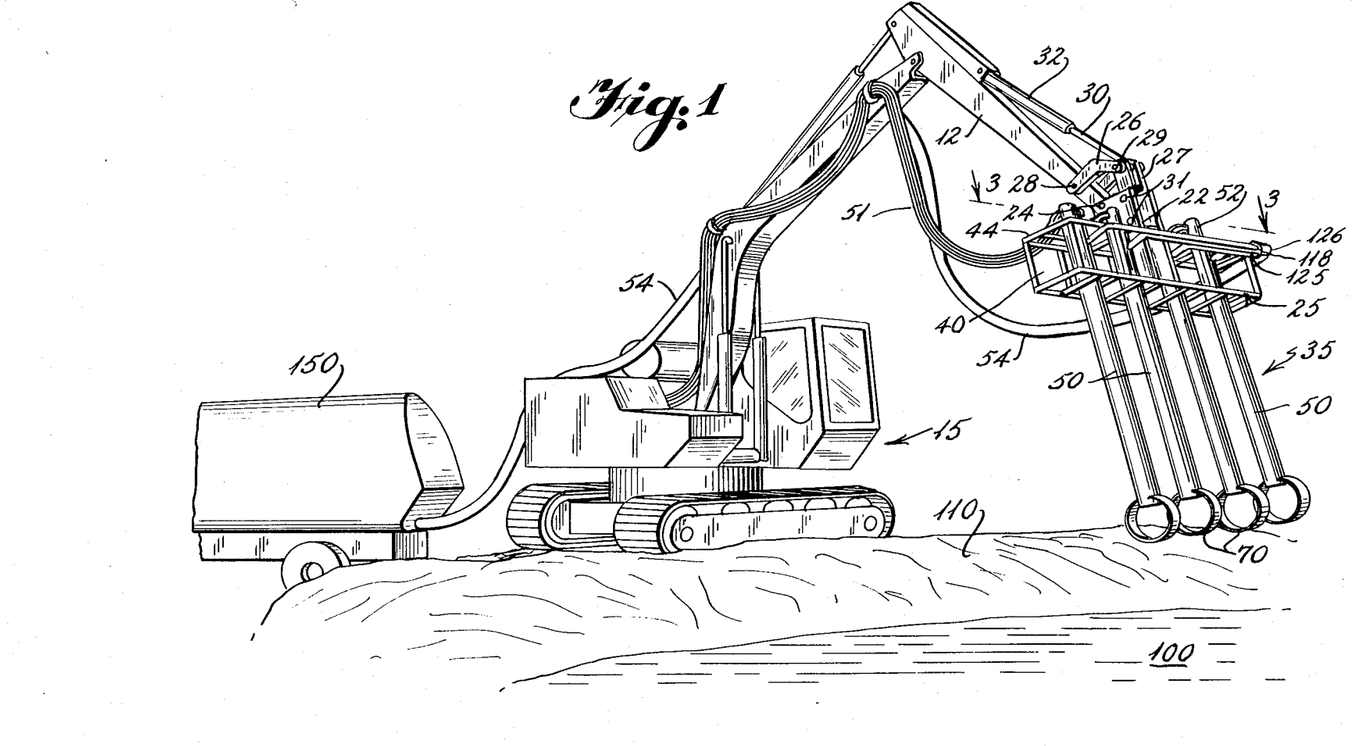
FIG. 1 is a diagrammatic view of the apparatus.
Figure 2:
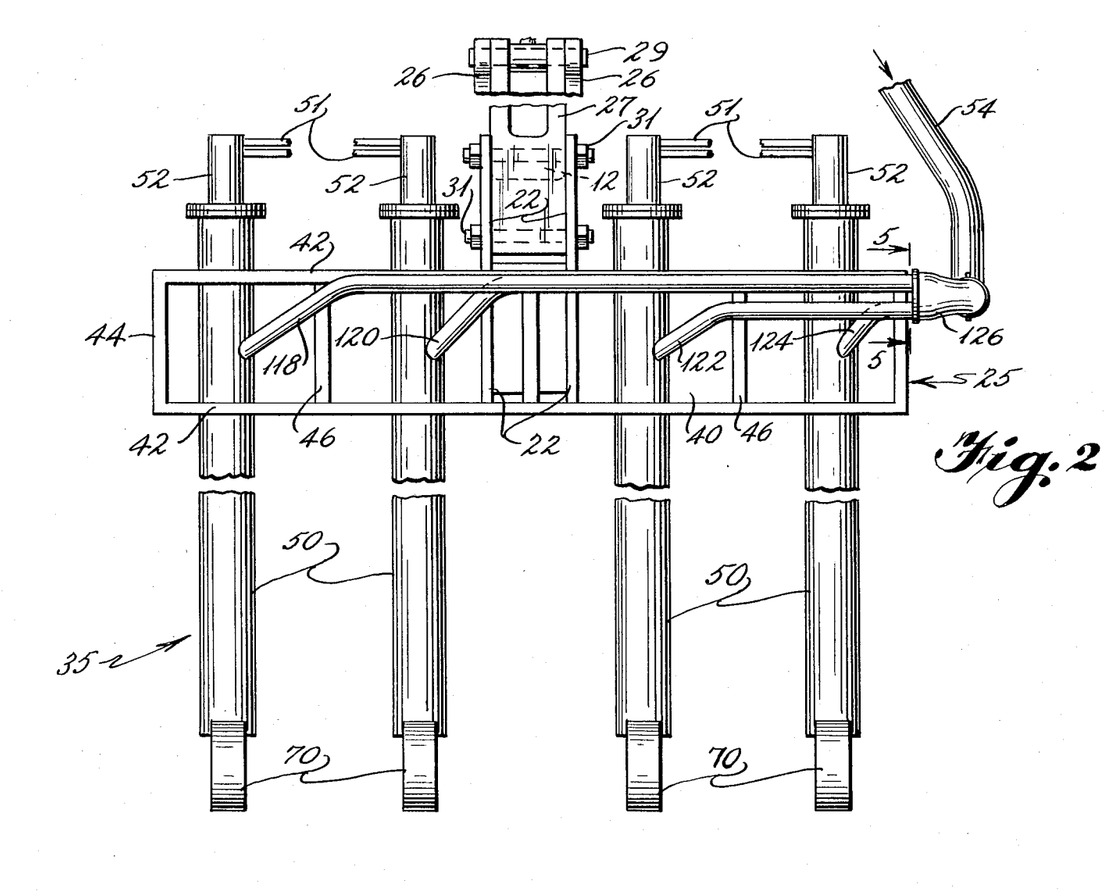
FIG. 2 is a front face view of the rake structure.

Thus, the operator of the backhoe 15 can extend framework 25 a more considerable distance beyond the banks 110 of a waste liquor catchment 100 than is illustrated by FIG. 1, and can angle framework 25 so that tube set 35 may be positioned at any desired angle from horizontal to vertical. The tube set 35 may be manipulated as desired, e.g., oscillated, and/or moved forward and backward, relative to the backhoe 15, and/or moved sideways. A skilled backhoe operator can make tube set 35 touch any spot within reach of the backhoe.

The framework 25 comprises an open box structure 40 formed by the four transverse beams 42 which beams may be pipes and corner crossbeams or pipes 44 welded or bolted together into a rigid structure. If desired, internal crossbeams means 46 may be added to further strengthen the box structure 40. The plates 22 are mounted centrally of box structure 40, extending above the box to provide place thereabove for their already described attachments to the backhoe. Also attached timely to box structure 40, e.g., by welding, are the individual tubes 50 of tube set 35. The details of attachment for tubes 50 and of plates 22 to box structure 40 and of the beams 42, 44, 46 within the box structure form no part of this invention. Suffice it to say that expedients besides welding are known in the art for assembling pipes or beams into a strong unitary box structure 40 with plates 22 and tubes 50 integrally secured thereto.

Figure 3:
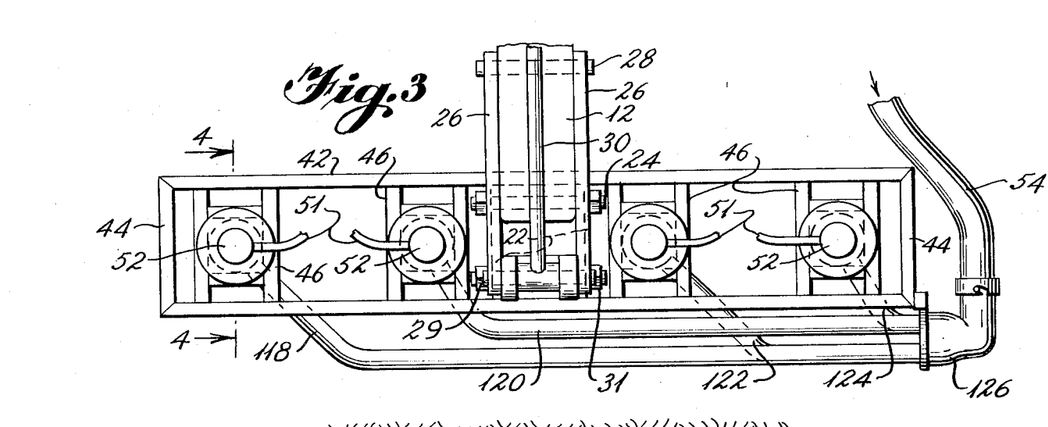
FIG. 3 is a top sectional view taken along line 3—3 of FIG. 1.

In the mode of the invention illustrated herein, pneumatic flow conduits 118, 120, 122, 124 are mounted at the front face side of box structure 40 (see FIG. 3). These flow conduits lead from a pneumatic flow splitter 126 of conventional structure to the four tubes 50, specifically, to inlet ports therein. A flexible pneumatic flow conduit 54 is extended from flow splitter 126 back along arm 12 of backhoe 15 to a source for the gaseous suspension of cementing maerial introduced to and from tube set 35.

Flexible conduits 126 for hydraulic fluid are extended over arm 12 of backhoe 15 from a source of hydraulic power (normally the backhoe itself) to the hydraulic motor 52 mounted atop each line 50 in the tube set 35. The motors 52 power the conveyor assist hereinafter described that facilitates dispensing the suspension of cementing material from tube set 35. Conventional hydraulic motors are contemplated. If desired, electric motors may be substituted for hydraulic motors 52. It may be noted that since framework 25 does not become immersed in the waste liquid of the catchment to be solidified, locating the pneumatic and hydraulic or electric connections on the framework 25 is convenient.

Figures 4, 5, 6:
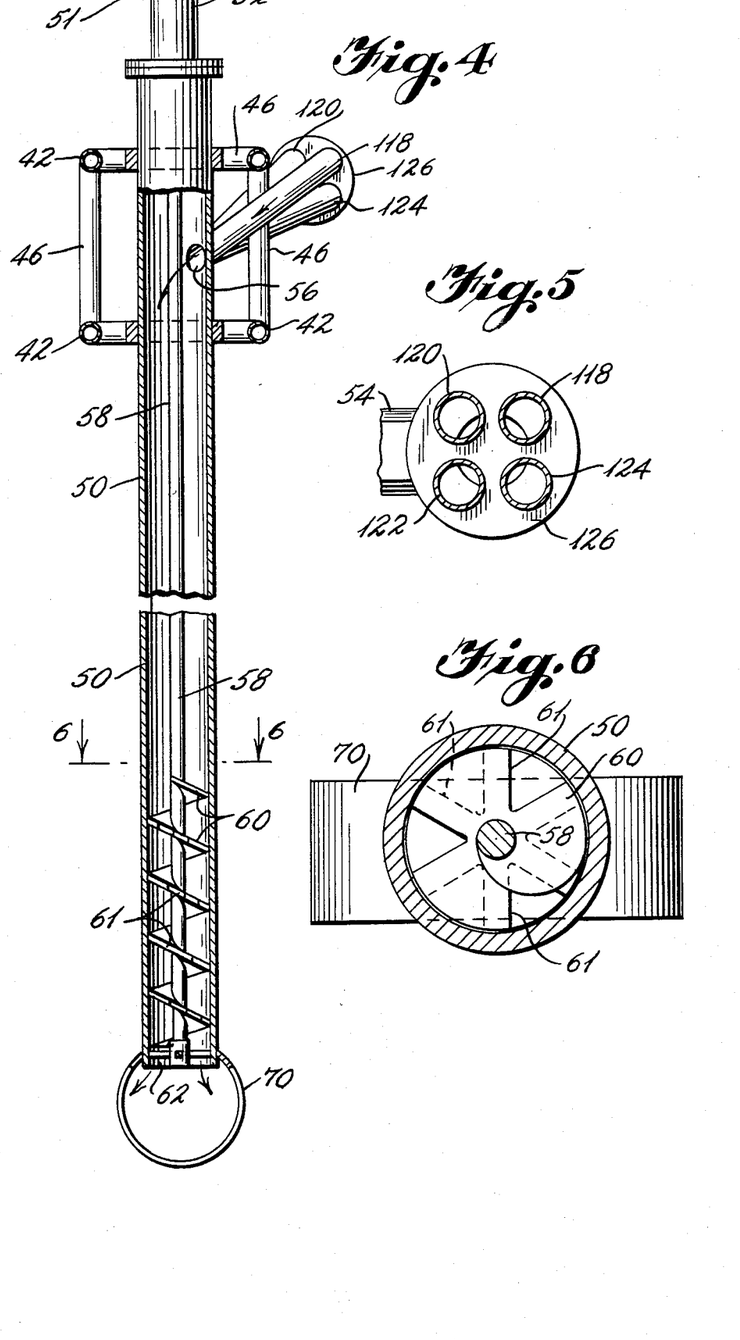
FIG. 4 is a side section of the rake structure taken along line 4—4 of FIG. 3.
FIG. 5 is a side section taken along line 5—5 of FIG. 2.
FIG. 6 is an enlarged section taken along line 6—6 of FIG. 4.

The tube set 35 is adapted to dispense a gaseous suspension of cementing solids. Since tubes 50 are of the same construction, the following description of one tube applies to all tubes 50. Reference is now made to FIGS. 4 and 6, whereon can be seen the internal structure of one tube 50. The tube set 35 is rather large, extending, for example, nine feet (9') from the bottom of box 40. Knee braces and side braces, not herein illustrated, have been found to be advisable. An exemplary tube size is 6⅜ inches outside diameter, and is 0.125 inch in thickness (typical oilwell goods tubing).

Mention has already been made that hydraulic motor 52 surmounts tube 50 and that a pneumatic flow conduit e.g., conduit 118 conducts suspension of cementing powder to a port 56 therein. Inside tube 50 is rotatable shaft 58 and serrated auger 60 powered by motor 52. At the bottom of each tube 50 is the guard means, namely, the ring 70 in the illustrated mode of the invention. Presence of ring 70 allows an open bottom at tube 50 to be the exit port 62 from tube 50.

Mention has been made that the conveyor structure, namely, for rotatable shaft 58 and auger 60, constitutes a power assist feed for the gaseous suspension of cementing solids. To allow suspension flow when auger 60 is halted, serrations 61 are provided, e.g., three 60° cutouts on every auger flight and the auger is short. Just a few flights of auger are provided, e.g., three flights adjacent the exit port 62 of each tube 50.

Since the gaseous suspension of cementation solids enters the tube set 35 under pressure, the suspension will blow through serrations 61 and out through the (open bottom) exit ports 62 into the liquid waste. However, it must be born in mind, that backpressure from the liquid waste being solidified varies considerably, depending first upon the liquid waste being solidified, is it fluid or viscous, then upon the extent to which solidification has occurred. The powered assist in each tube 50 provided by the motor driven auger 60 counters the backpressure so that gaseous suspension will be introduced into a virtually solidified mass of material. Presence of auger flighting the complete length of shaft 130, has proven not to be necessary, nor even desirable. Two to five auger flights appears to be about the optimum, three having been employed in preferred embodiments of the invention. Moreover, it has been found desirable to employ relatively large serrations in the auger flighting, triangular openings with an apex angle of 20° to 50°, 30° or 45° being preferred apex angles for the cutouts 61, with two, three or four of such cutouts per flight. On occasion, the auger assist may be eliminated altogether.

To some extent, the power assisted feed of cementing material suspension compensates for instances where one or two tubes 50 of the tube set 35 are located in partly solidified material, but the remaining tubes 50 are still in liquid waste material, then cementation solids continues to be dispensed from all tubes 50, but the more liquid areas will receive greater proportions of the cementing material, thus facilitating treatment of unsolidified pockets of fluid during the course of an overall solidification operation.

Figure 9:
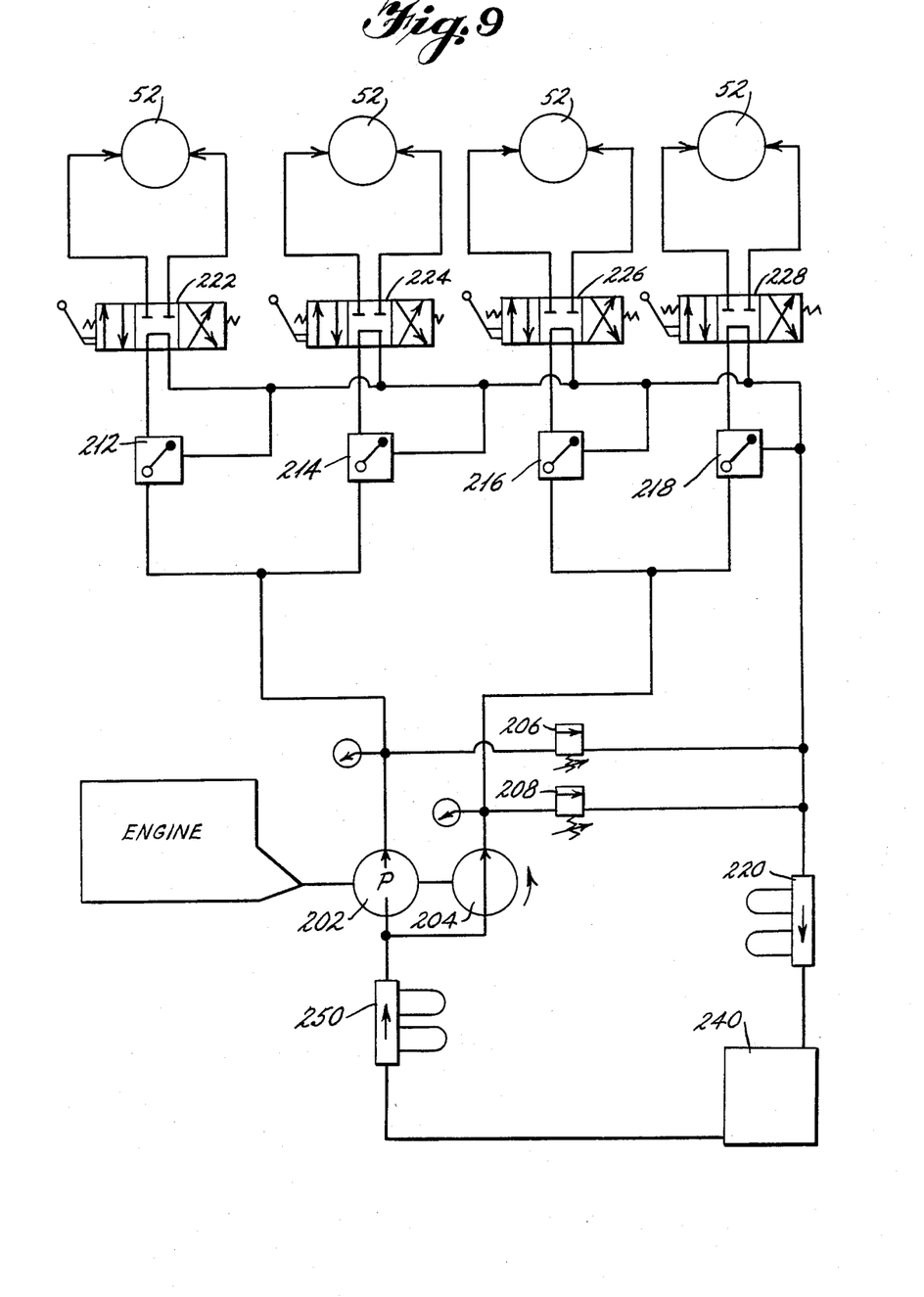
FIG. 9 is a schematic representation of the operating system for the hydraulic motors in the apparatus.

FIG. 9 illustrates a preferred mode operating and control system for the hydraulic motors 52. A reciprocating engine, suitably the engine on backhoe 15, drives a pair of hydraulic pumps 202, 204. The oil from pumps 202, 204, respectively, passes through relief valve systems 206, 208 which maintain a suitable system pressure, e.g., 2100 p.s.i. The high pressure oil is routed to four flow dividers 212, 214, 216, 218, whose purpose is to regulate the speed of each hydraulic motor. From flow dividers 212, 214, 216, 218, respectively, oil flows to the valves 222, 224, 226, 228 controlling individual motors 52. All return oil flow, i.e., from motors 52, valves 222, 224, 226, 228, flow dividers 212, 214, 216, 218 and pressure relief valve systems 206, 208 pass into a common conduit. The returning oil passes through return filters 220 to an oil reservoir 240, then from oil reservoir 240 through suction filters 250 into the hydraulic pumps 202, 204.

Practice of the present invention is particularly well adapted to the solidification of sludge pits, such being catchments into which oil field wastes are discharged. Thousands upon throusands of sludge pits have been created over the years. Conveniently, fly ash, a well known generally alkaline waste product from coal fired power plants is effective to neutralize the acidity of the usual sludge pit and, moreover, will serve in solidification of the liquid in the sludge pit.

Ordinarily, the sludge pit occupies a depression in the local terrain that had been scooped out for the purpose. The underlying basement soil is often compacted and is relatively water impermeable. A soil bank several feet above the liquid surface, usually the scooped out earth, often surrounds the sludge pit. Conveniently, the soil bank material may be used for cover over the solidified sludge pit.

Figure 7:
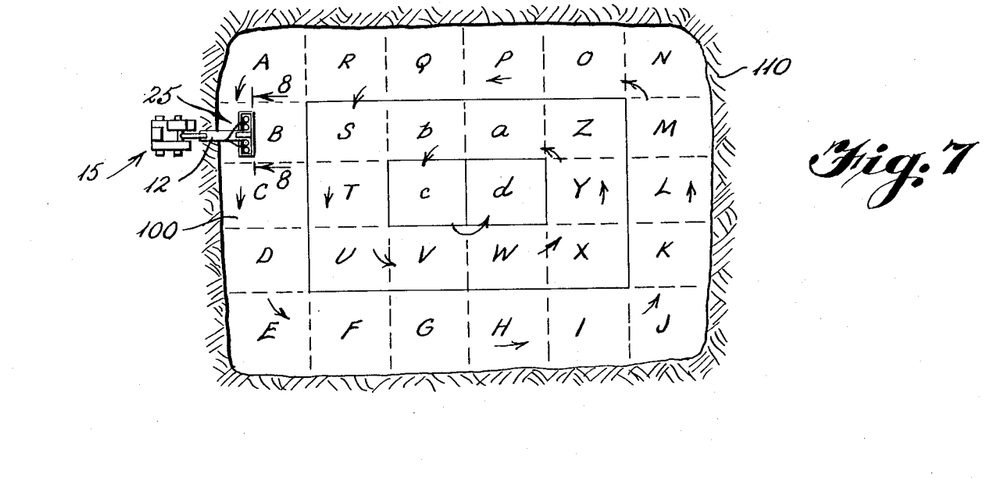
FIG. 7 is a top view of a waste liquid catchment being solidified.
Figure 8:
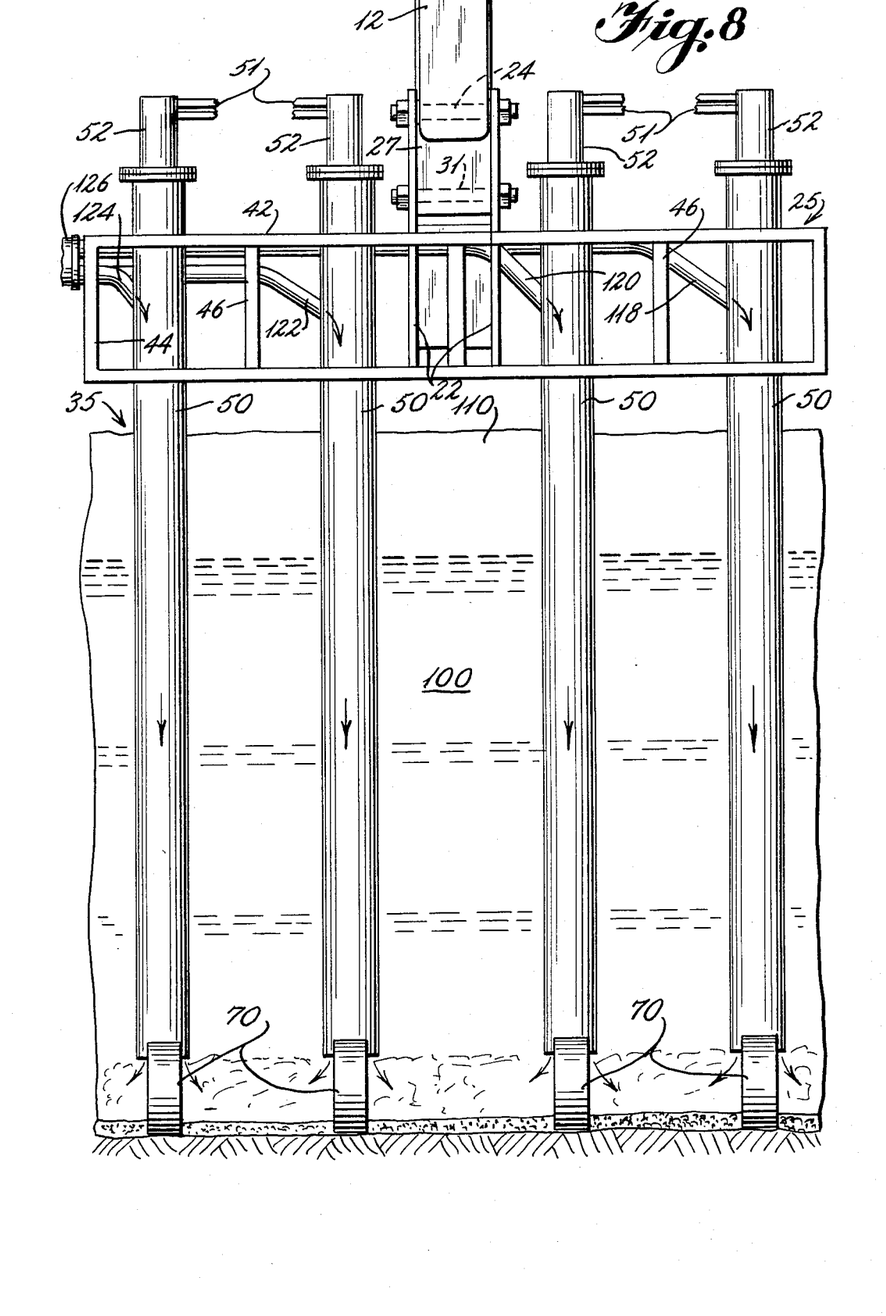
FIG. 8 is a rear face view of the rake structure immersed in a waste liquid catchment.

To solidify the sludge pit, a backhoe 15, on which is mounted the apparatus of this invention, rolls up on the bank 110 of the sludge pit 100 and the backhoe arm 12 is extended out over the liquid of the sludge pit, as generally is illustrated by FIGS. 1 and 7. To provide some idea of the scale involved in the apparatus of this invention, it is noted that arm 12 may extend thirty feet from the bank edge and tube set 35 can enter the waste liquid to nearly nine feet in depth, yet leave framework 25 above the liquid level. A cement or fly ash carrier truck 150, driven quite close to the backhoe 10, is coupled to the pneumatic carrier hose 54. Once the apparatus is ready to operate, the tube set 35 is inserted into the liquid of the catchment e.g., of sludge pit 100 and introduction of a suspension of (compressed) air and cement, fly ash, or other suitable material into the liquid through the (tube bottom) ports 62 commences. It is noteworthy that although sludge pits and settling ponds and other standing bodies of liquid to be solidified, are rarely more than eight feet deep, depth does not constitute a limitation on practice of this invention.

The gaseous suspension of solids is introduced at the bottom of tube set 35 and agitates the liquid. Also, the mechanical linkage of arm 12 allows the apparatus to be swung back and forth, side to side, and even pivoted causing the solidification of the waste liquid to be carried out across a large bottom area of the catchment. In a surprisingly short period of time, a solidified mass will have built up to the level of rings 70 across the whole working area B (see FIG. 7). A combination of agitation by the gas introduced with cementation solids and movement of tube set 35 distributes the solidifying material throughout the working area in the catchment.

The backhoe operator can feel the increasing resistance to movement of tube set 35 and recognizes when to halt further introduction of the suspension into the now solidified region of the catchment. In the instance of a deep catchment, solidifying of a large area of bottom layer at a time is suggested, after which tube set 35 is raised and smaller surface regions of the catchment solidified. When solidifying shallow portions of the catchment, the operator has a personal interest to consider, namely, creation of solid enough ground to support the backhoe and upon which the backhoe will later advance. In any event, a solid bench is generated at the edge of the sludge pit, sticking out into the waste liquid catchment, e.g., the region B in the sludge pit of FIG. 7.

Once the catchment area B within convenient reach of backhoe arm 12 has been converted into a bench extension of the bank, e.g., thirty by thirty foot bench, backhoe 15 is then advanced bankside and then the solidification operation is repeated to solidify area C. In this fashion, the catchment is completely encircled and made smaller. By way of an example, a thirty foot bench around the catchment is created.

In any event, once the catchment has been completely encircled and an appropriately sized bench has been formed thereon, the waste material solidified in the bench has been solidified into a form that is solid enough to support heavy equipment, such as bulldozers, cement carriers, and of course, the backhoe. The backhoe is then advanced onto the bench and solidification operations commence again to extend the bench further into the catchment basin. It is noted that area A and S can be solidified from a bench on area R. The backhoe circles the catchment periphery as often as is necessary to solidify the waste liquid in the entire catchment. To repeat, the waste liquid in the catchment becomes solid through chemical reaction with the cementing material, e.g., cement or fly ash. In consequence, leaching of relatively hazardous substances that had been dissolved in waste liquid is essentially eliminated or substantially reduced, which then protects the purity of the subterranean waters below the catchment basin. To repeat, the final solidified mass is not a concrete layer. Rather it is in the nature of a soil.

I claim:

1. A solidification apparatus adapted for integral attachment to a backhoe or the like which comprises:

a rack having means thereon adapted for an integral, but pivotal attachment to the arm of a backhoe whereby said rack will form an extension thereon and thereby be capable of longitudinal, lateral, and pivotal movement;

a multiplicity of parallel hollow rigid tubes extending longitudinally from said rack, said tubes being integrally attached to said rack and movable therewith;

means for feeding a gaseous suspension of cementing solids into each hollow tube at the rack end thereof, and a port at the other end of each hollow tube adapted for discharging the gaseous suspesion of cementing solids;

a rotatable shaft in each hollow tube extending the length thereof and motor means on said rack for rotating each said shaft; and a serrated auger mounted on each rotatable shaft for assisting flow of the gaseous suspension of cementing solids through each said hollow tube and out the port thereof the serrations allowing flow of gaseous suspension through each tube in the event rotation of shaft and auger becomes halted;

whereby said tubes may be introduced into a body of waste liquid to be solidified with the ports on said tubes submerged beneath the liquid surface and said tubes moved longitudinally, laterally, and pivotally in the waste liquid while a gaseous suspension of cementing solids is being introduced into said body of waste liquid from said ports.

2. The solidification apparatus of claim 1 further comprising open guard means extending longitudinally forward of each said hollow tube, said guard means serving to avoid embedding of the ports of said tubes beneath the body of waste liquid into which the tubes are introduced.

3. The solidification apparatus of claim 2 wherein said guard means comprises an open ring member protecting the port opening of each said tube.

4. A solidification apparatus adapted for integral attachment to a backhoe or the like which comprises:

a rack having means thereon adapted for pivotal attachment to the arm of a backhoe whereby said rack will form an extension thereon and thereby be capable of longitudinal, lateral, and pivotal movement;

a multiplicity of parallel hollow rigid tubes extending longitudinally from said rack, said tubes being integrally attached to said rack and movable therewith;

means of feeding a gaseous suspension of cementing solids into each hollow tube at the rack end thereof, and a port at the other end of each hollow tube adapted for discharging the gaseous suspension of cementing solids; and an open guard means extending longitudinally forward of the end of each said hollow tube nearest the port, said guard means serving to avoid embedding of the ports of said tubes beneath the body of waste liquid into which the tubes are introduced, whereby said tubes may be introduced into a body of waste liquid to be solidified with the ports on said tubes beneath the liquid surface, and said tubes moved longitudinally, laterally and pivotally in the waste liquid while a gaseous suspension of cementing solids is being introduced into said body of waste liquid from said ports.

5. The solidification apparatus of claim 4 wherein said guard means comprises an open ring member protecting the port opening of each said tube.

6. The solidification apparatus of claim 4 containing thereon means for feeding a gaseous suspension of cementing solids thereto which suspension feeding means comprises a suspension splitter positioned on said rack to which is connected a suspension supply line, said splitter dividing the gaseous suspension of cementing solids into a separate suspension supply for each hollow tube.

* * * * *